United States Patent
Kumar

(10) Patent No.: US 6,604,726 B2
(45) Date of Patent: Aug. 12, 2003

(54) PROPORTIONAL SOLENOID-CONTROLLED FLUID VALVE ASSEMBLY WITHOUT NON-MAGNETIC ALIGNMENT SUPPORT ELEMENT

(75) Inventor: Viraraghavan S. Kumar, Palm Bay, FL (US)

(73) Assignee: Teknocraft, Inc., Melbourne, FL (US)

( * ) Notice: Subject to any disclaimer, the term of this patent is extended or adjusted under 35 U.S.C. 154(b) by 0 days.

(21) Appl. No.: 09/905,397

(22) Filed: Jul. 13, 2001

(65) Prior Publication Data

US 2002/0000530 A1 Jan. 3, 2002

Related U.S. Application Data

(63) Continuation-in-part of application No. 09/846,425, filed on May 1, 2001, which is a continuation of application No. 09/535,757, filed on Mar. 28, 2000, now Pat. No. 6,224,033, which is a continuation of application No. 08/988,369, filed on Dec. 10, 1997, now Pat. No. 6,047,947, which is a continuation-in-part of application No. 08/632,137, filed on Apr. 15, 1996, now Pat. No. 5,785,298.
(60) Provisional application No. 60/219,722, filed on Jul. 19, 2000.

(51) Int. Cl.[7] ............................................... F16K 31/06
(52) U.S. Cl. ........................ 251/129.16; 251/129.17; 335/281; 335/297
(58) Field of Search ................. 251/129.15, 129.16, 251/129.17; 335/281, 297

(56) References Cited

U.S. PATENT DOCUMENTS

| | | | |
|---|---|---|---|
| 3,060,353 A | * 10/1962 | Shansky et al. | 335/297 |
| 3,250,293 A | 5/1966 | Adams | |
| 3,368,791 A | 2/1968 | Wells | 251/129.16 X |
| 3,562,686 A | * 2/1971 | Borschers | 335/281 |
| 3,900,822 A | 8/1975 | Hardwick et al. | 355/268 |
| 4,442,998 A | 4/1984 | Ohyama et al. | 251/282 |
| 4,463,332 A | 7/1984 | Everett | 335/258 |
| 4,476,451 A | * 10/1984 | Kosugi | 335/281 |
| 4,579,145 A | * 4/1986 | Leiber et al. | 251/129.16 |
| 4,604,600 A | * 8/1986 | Clark | 335/281 |
| 4,633,209 A | 12/1986 | Belbel et al. | 355/279 X |
| 4,635,683 A | 1/1987 | Nielsen | 137/625.65 |
| 4,767,097 A | 8/1988 | Everett et al. | 251/129.08 |
| 4,855,702 A | * 8/1989 | Swanson et al. | 335/281 |
| 4,954,799 A | 9/1990 | Kumar | 335/236 |
| 5,010,312 A | 4/1991 | Motykiewicz | 335/279 X |
| 5,064,166 A | 11/1991 | Schechter | 251/129.15 |
| 5,066,980 A | * 11/1991 | Schweizer | 335/281 |
| 5,110,087 A | 5/1992 | Studtmann et al. | 251/129.16 |
| 5,131,624 A | 7/1992 | Kreuter et al. | 251/129.16 X |
| 5,218,999 A | 6/1993 | Tanimoto | 251/129.16 X |
| 5,240,227 A | * 8/1993 | Sich | 251/129.15 |
| 5,301,921 A | 4/1994 | Kumar | 251/129.08 |
| 5,407,174 A | 4/1995 | Kumar | 251/129.08 |
| 5,417,373 A | 5/1995 | Facchin | 251/129.16 X |
| 5,427,352 A | * 6/1995 | Brehm | 251/129.16 |

(List continued on next page.)

FOREIGN PATENT DOCUMENTS

CA   2020787   10/1994
EP   0 204 293   3/1985

*Primary Examiner*—John Revill
(74) *Attorney, Agent, or Firm*—The Bilicki Law Firm, P.C.

(57) ABSTRACT

A proportional solenoid-driven valve control assembly contains a moveable, magnetic armature positioned adjacent to one end of a fixed magnetic pole piece. The magnetic pole piece has a longitudinal axial pole piece portion, and a relatively thin, annular axial pole piece portion, that rapidly saturates, and is effectively mechanically solid with the longitudinal pole piece portion for fluid leakage containment. A radial portion is solid with the annular axial portion and provides support and alignment for the armature relative to the magnetic pole piece, without the need for non-magnetic material for alignment, support or magnetic flux flow path control.

19 Claims, 7 Drawing Sheets

U.S. PATENT DOCUMENTS

| | | | |
|---|---|---|---|
| 5,447,288 A | 9/1995 | Keuerleber et al. | 251/129.16 X |
| 5,462,253 A | 10/1995 | Asthana et al. | 251/129.16 X |
| 5,516,076 A | 5/1996 | Stobbs et al. | 251/129.16 |
| 5,547,165 A * | 8/1996 | Brehm et al. | 251/129.16 |
| 5,785,298 A | 7/1998 | Kumar | 251/129.16 |
| 5,986,530 A | 11/1999 | Nippert et al. | 335/289 |
| 6,047,947 A | 4/2000 | Kumar | 251/129.16 |
| 6,050,542 A | 4/2000 | Johnson et al. | 251/129.15 |

* cited by examiner

PROPORTIONAL SOLENOID-CONTROLLED FLUID VALVE ASSEMBLY WITHOUT NON-MAGNETIC ALIGNMENT SUPPORT ELEMENT

CROSS-REFERENCE TO RELATED APPLICATION

The present application claims the benefit of U.S. provisional patent application, Ser. No. 60/219,722, filed Jul. 19, 2000, by V. Kumar, entitled: "Proportional Solenoid-Controlled Fluid Valve Assembly Without Non-Magnetic Alignment Support Element," and is a continuation-in-part of U.S. patent application Ser. No. 09/846,425, filed May 1, 2001 (hereinafter referred to as the '425 application), which is a continuation of U.S. patent application Ser. No. 09/535,757 filed Mar. 28, 2000, now U.S. Pat. No. 6,224,033, issued May 1, 2001 (hereinafter referred to as the '033 patent), which is a continuation of U.S. patent application Ser. No. 08/988,369, filed Dec. 10, 1997, now U.S. Pat. No. 6,047,947 (hereinafter referred to as the '947 patent), issued Apr. 11, 2000, which is a continuation-in-part of U.S. patent application Ser. No. 08/632,137, filed Apr. 15, 1996, now U.S. Pat. No. 5,785,298, issued Jul. 28, 1998 (hereinafter referred to as the '298 patent), each entitled "Proportional Solenoid-Controlled Fluid Valve Assembly," by V. Kumar, each application being assigned to the assignee of the present application and the disclosures of which are incorporated herein.

FIELD OF THE INVENTION

The present invention relates in general to solenoid-operated fluid control valves of the type described in the '425 application and the '033 and '947 Patents, which may be used in precision fluid flow regulation systems, such as those that require precise control of the rate of fluid flow, including but not limited to pneumatic and hydraulic regulation. The invention is particularly directed to a modification of the configuration of the magnetic pole piece, that obviates the need for an alignment and support element of non-magnetic material, thereby reducing the complexity and cost of manufacturing.

BACKGROUND OF THE INVENTION

As described in the above-referenced '425 application and the '033 and '947 patents, precision fluid flow control devices commonly employ a solenoid-operated valve for controlling fluid flow substantially proportional to the current applied to the solenoid. It is also desirable that hysteresis in the flow rate versus control current characteristic (which creates an undesirable dead band in the operation of the valve) be maintained within some minimum value. A standard practice for reducing hysteresis has been to physically support the solenoid's moveable armature within the bore of its surrounding drive coil by means of low friction bearings, such as Teflon rings. However, even with the use of such a low friction material, there is still significant 'dead band' current (e.g. on the order of forty-five milliamps), which limits the operational precision of the valve.

One proposal to deal with this physical contact-created hysteresis problem is to remove the armature support mechanism from within the bore of the solenoid coil (where the unwanted friction of the armature support bearings is encountered) to an end portion of the coil, and to support the armature for movement within the bore by means of a spring mechanism located outside of the solenoid coil. An example of such a valve configuration is described in the U.S. Pat. to Everett, No. 4,463,332, issued Jul. 31, 1984.

According to this patented design, the valve is attached to one end of an armature assembly supported for axial movement within the cylindrical bore of the solenoid coil and having a permanent ring magnet surrounding the solenoid. One end of the solenoid contains a ring and spring armature support assembly, located substantially outside the (high flux density) solenoid bore, and whose position can be changed, so as to adjust the axial magnetic flux gap within the bore and thereby the force applied to the valve.

Unfortunately, this type of support structure requires a magnetic flux booster component which, in the patented design, is a permanent magnet. Namely, even though the objective of the Everett design is to adjust magnetic permeance and maintain linearity, the overall solenoid structure and individual parts of the solenoid, particularly the ring spring armature assembly (which itself is a complicated brazed part), and the use of a permanent booster magnet, are complex and not easily manufacturable with low cost machining and assembly techniques, resulting in a high price tag per unit. In another prior art configuration, described in the U.S. Pat. to Nielsen, No. 4,635,683, the movable armature is placed outside the bore by means of a plurality of spiral spring-shaped bearings adjacent to opposite ends of the solenoid structure.

Advantageously, the linear motion proportional solenoid assembly described in U.S. Pat. No. 4,954,799 (hereinafter referred to as the '799 patent) entitled: "Proportional Electropneumatic Solenoid-Controlled Valve," improves on the above designs by using a pair of thin, highly flexible annular cantilever-configured suspension springs, to support a moveable armature within the bore of solenoid, such that the moveable armature is intimately coupled with its generated electromagnetic field (thereby eliminating the need for a permanent magnet as in the Everett design).

In order to make the force imparted to the movable armature substantially constant, irrespective of the magnitude of an axial air gap between the armature and an adjacent magnetic pole piece, the device detailed in the '799 Patent places an auxiliary cylindrical pole piece region adjacent to the axial air gap. This auxiliary cylindrical pole piece region has a varying thickness in the axial direction, which serves to 'shunt' a portion of the magnetic flux that normally passes across the axial gap between the armature assembly and the pole piece element to a path of low reluctance. By shunting the flux away from what would otherwise be a high reluctance axial path through a low reluctance path, the auxiliary pole piece region effectively 'linearizes', the displacement vs. current characteristic over a prescribed range.

The proportional solenoid structure described in the '298 Patent and diagrammatically shown in FIGS. 1 and 2, reduces the structural and manufacturing complexity of the implementation of the structure described in the '799 Patent by locating a moveable, ferromagnetic (or simply magnetic) armature 10 adjacent to one end of a fixed pole piece 12 made of ferromagnetic (magnetic) material that protrudes outside a solenoid coil bore 14, and configuring this moveable armature 10 to provide two, relatively low reluctance magnetic flux paths 21 and 22. (For a description of additional details of the solenoid-actuated valve structure shown in FIGS. 1 and 2, attention may be directed to the '298 Patent, proper.)

Now even though the proportional solenoid structure described in the '298 Patent operates extremely well in relatively small and larger sized hardware configurations, for very small (e.g., micro-valve) applications and using reasonable priced industry standard materials, it is possible for one or more components of the assembly may become distorted, particularly those parts that are very small and dimensionally thin (such as the moveable armature's support springs). Namely, for very small dimension applications, what would otherwise be a negligible axial magnetic flux component accompanying the dominant radial flux component bridging the variable geometry radial air gap 32 between the saturated tapered rim portion 34 of the moveable armature 10 and the inwardly projecting tapered portion 36 of the solenoid assembly housing 30 becomes significant.

In particular, the non-radially directed magnetic flux in the variable geometry air gap 32 can overcome the mechanical rigidity of the material (e.g., beryllium copper) of the armature support springs 41 and 42, and cause the springs to warp or twist from their intended shape, and deviate from their intended axial cantilever axial flexing.

This unwanted distortion of the armature support springs is particularly likely where there are nontrivial departures from dimensional tolerances in the manufacturing of the parts of the solenoid assembly. Because of the variable geometry gap inherently tends to provide some degree of play between the armature and the housing, distortion of the armature support springs can cause an unbalanced physical engagement of the tapered rim portion of the moveable armature with the inwardly projecting tapered portion of the housing, thereby preventing proper operation of the proportional solenoid assembly.

The invention disclosed in the '425 application and the '033 and '947 Patents (diagrammatically illustrated in FIGS. 3 and 4 as comprising a valve unit 100 coupled with a valve-control solenoid unit 200) remedies this component distortion problem by modifying the configuration of the moveable armature to eliminate the variable geometry annular air gap between the radially projecting, tapered rim portion of the moveable armature and the inwardly projecting tapered portion of the solenoid assembly housing, while still retaining their flux control functionality. (For a description of additional details of the solenoid-actuated valve structure shown in FIGS. 3 and 4, attention may be directed to the '033 and '947 Patents, proper.)

While the solenoid structure of the '033 and '947 Patents and the '425 application is very effective in eliminating the variable geometry annular air gap between the radially projecting, tapered rim portion of the moveable armature and the inwardly projecting tapered portion of the solenoid assembly housing, it uses a non-ferromagnetic element (in the form of a step-shaped step-shaped annular support ring 206), to confine the magnetic flux path between the lower end of the magnetic pole piece 220 and the movable armature 170, and to maintain all of the elements in coaxial alignment.

Installation of a non-ferromagnetic element has a number of drawbacks, particularly with regard to manufacturing complexity and incorporating metallurgically diverse materials in the overall magnetic flux formation and confinement path. In the architecture of the '033 and '947 Patents and the '425 application, the entire solenoid structure is constructed in such a way as to isolate the fluid medium from the internal solenoid components by the use of isolation diaphragm. Since the internal volume of the solenoid assembly is not subjected to any fluid pressures, it is possible to design the solenoid in such a way, that the non-magnetic element is fixed in place, thereby providing structural rigidity and coaxial alignment. However, the non-magnetic circuit is essential for the proper operation of the solenoid. In applications where the use of the diaphragm is unacceptable, such as miniature valves or high pressure valves, then the structure of the solenoid has to be changed to resort to other mechanical assembly and manufacturing processes.

If the fluid is allowed inside the solenoid, then this non-magnetic circuit is accomplished by placing a non-magnetic element and rigidly attaching it to a magnetic element above and below, by means of manufacturing processes that are costly and tedious. Techniques that are used for this purposes include but not limited to: swaging, electron beam welding, laser welding, brazing etc. In most instances, a secondary machining operation would be necessary, in order to achieve coaxial alignment of the magnetic and non-magnetic parts.

Even with successful (and costly) assembly of the components, there still remains the issue of employing different metals with different coefficients of thermal expansion.

One proposal to address these and other problems associated with the use of non-ferromagnetic materials for magnetic flux path control in the solenoid assembly is described in the U.S. Pat. to Nippert et al, No. 5,986,530. The solution offered by the Nippert el. al Patent, which still requires the use of a non-ferromagnetic material for magnetic flux path control, is to form an annular dual-tapered groove in the external surface of a single piece of ferromagnetic stock, which serves as the solenoid housing. By forming the housing from a single piece of ferromagnetic material, the patentees seek to avoid concentricity (alignment) problems of conventional solenoid assemblies. The dual tapered groove is then filled with a non-ferromagnetic material, as by gas tungsten brazing/welding, and an axial bore is formed through the housing so as to intersect the groove. What results is a structure having two separate tapered ferromagnetic pieces joined by a tapered sleeve of non-ferromagnetic material. The non-ferromagnetic sleeve serves as a bearing for supporting an armature and associated armature pin (pole piece) within the housing.

Now even though Nippert et al seek to define the intended flux path and achieve component alignment by referencing the overall assembly process to a single piece of ferromagnetic stock, their proposed assembly scheme still requires the use of a non-ferromagnetic element, drawbacks of which are enumerated above.

SUMMARY OF THE INVENTION

In accordance with the present invention, the use of a non-magnetic material in the magnetic flux flow path of a proportional solenoid architecture is eliminated, by configuring the ferromagnetic pole piece to include a main longitudinal axial pole piece portion, and a relatively thin, annular axial pole piece portion that is effectively mechanically solid with the main longitudinal pole piece portion and is configured to provide for fluid leakage containment. The magnetic pole piece further includes a radial portion that is solid with the annular axial portion.

The radial portion of the magnetic pole piece is affixed to both the solenoid's housing and a valve unit. As such and being solid with the annular axial pole piece portion, it enables the magnetic pole piece to provide support and alignment for the armature relative to the magnetic pole piece, without the need for non-magnetic material for alignment, support or magnetic flux flow path control. The valve unit includes a valve poppet coupled with the axially movable armature, so as to regulate fluid flow between a fluid input port and a fluid exit port of the valve unit.

Since the integral pole piece and support architecture of the invention does not require a non-magnetic material in the magnetic flux flow path or as part of its support structure, it reduces hardware and manufacturing complexity and cost, particularly the need for welding, associated with solenoid structures that use non-ferromagnetic materials as part of flux path containment and pole piece/armature alignment.

DETAILED DESCRIPTION

Figure 1:
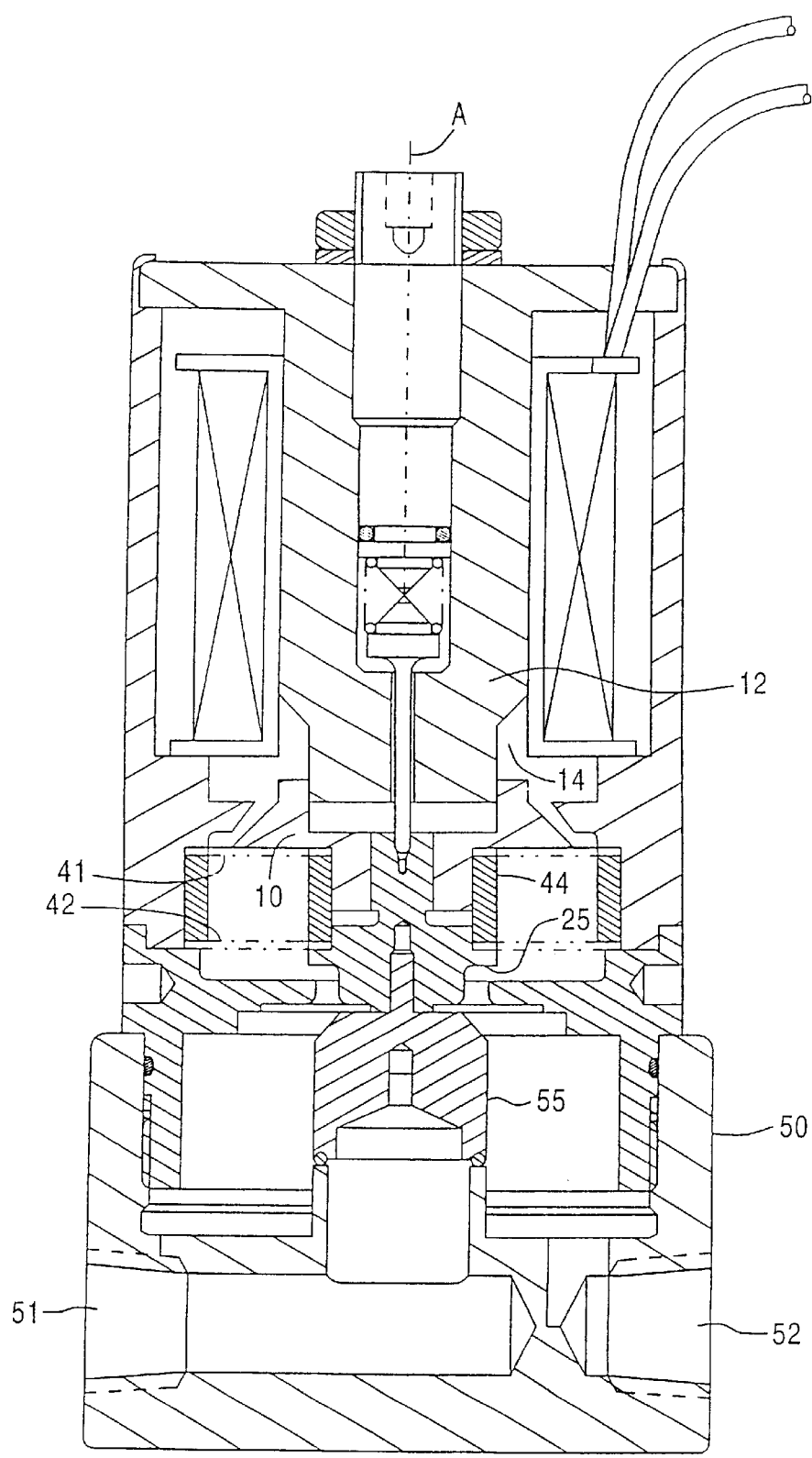
FIG. 1 is a longitudinal, cross-sectional diagrammatic illustration of a proportional solenoid-controlled fluid valve assembly disclosed in U.S. Pat. No. 5,785,298.
Figure 2:
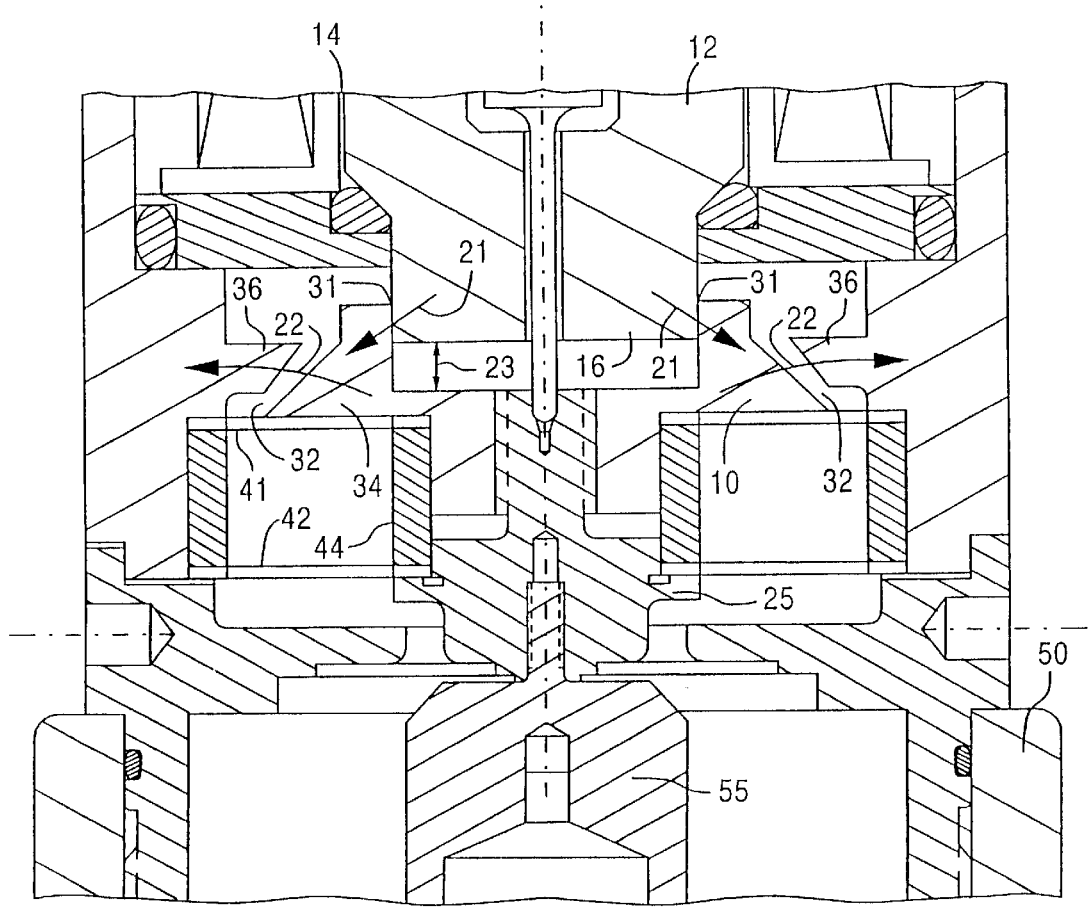
FIG. 2 is an enlarged view of a portion of FIG. 1.
Figure 3:
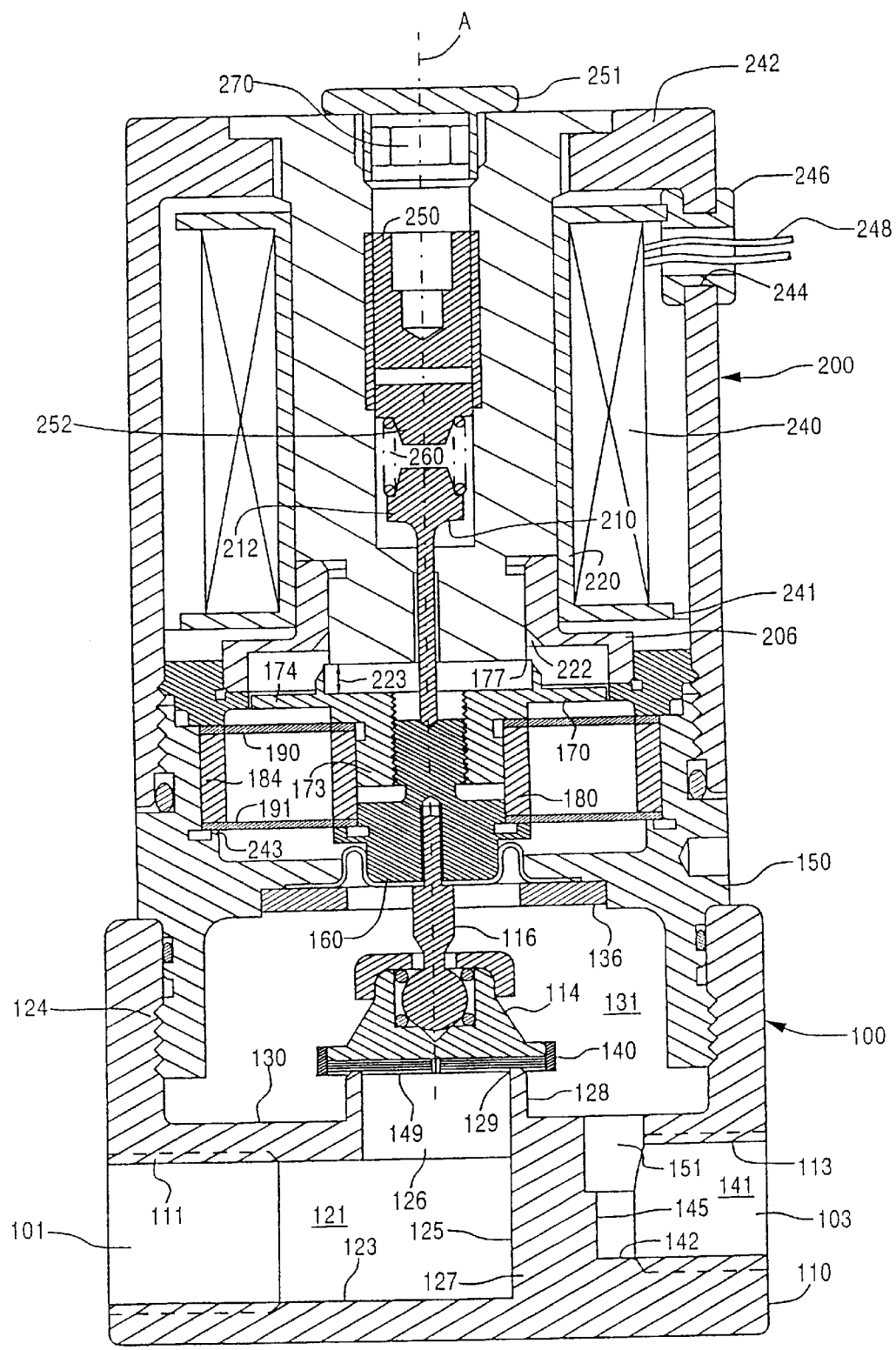
FIG. 3 is a longitudinal, cross-sectional diagrammatic illustration of a proportional solenoid-controlled fluid valve assembly in accordance with the invention disclosed in the '425 application and the '033 and '947 Patents.
Figure 4:
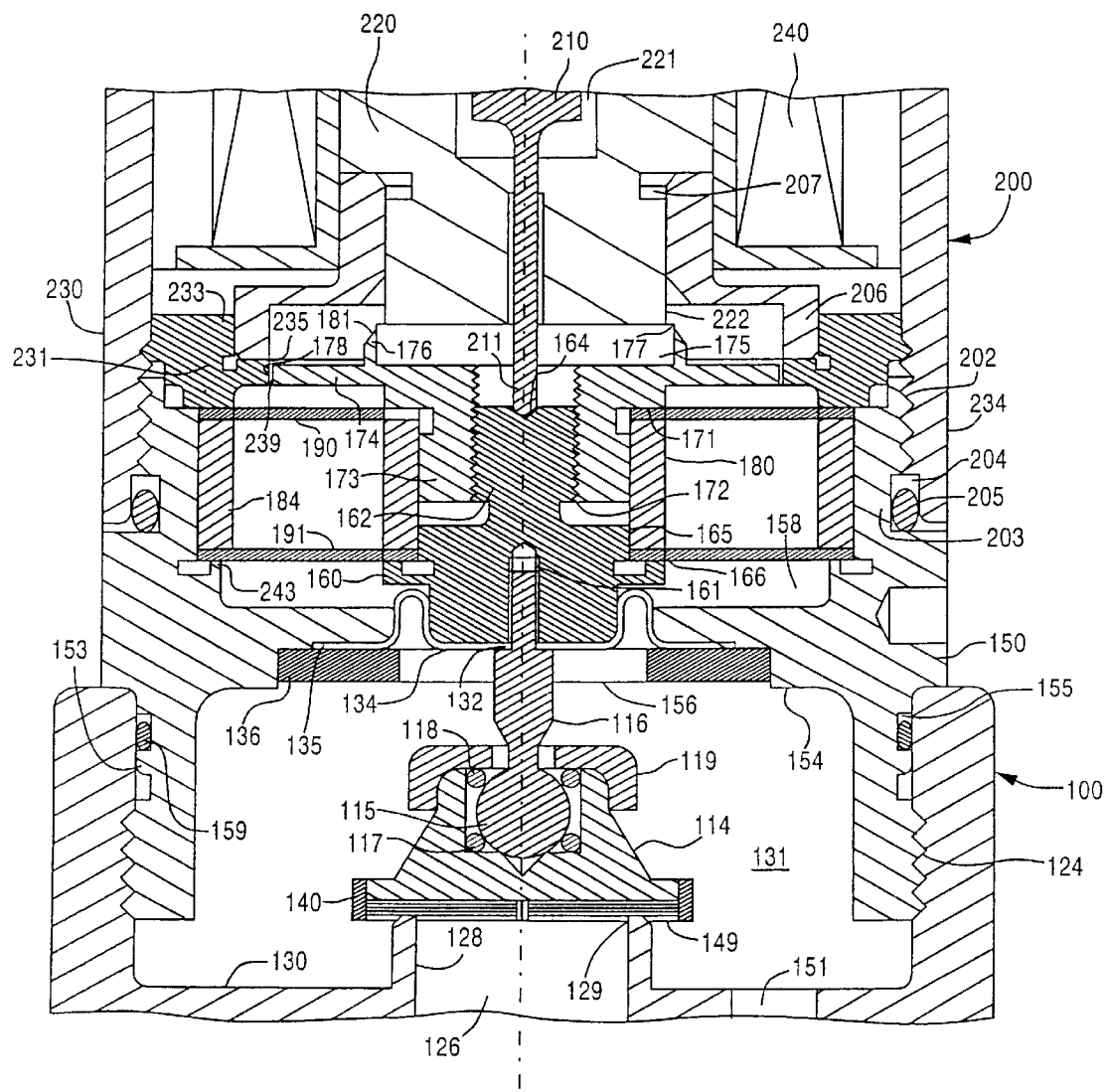
FIG. 4 is an enlarged view of a portion of FIG. 3.
Figure 5:
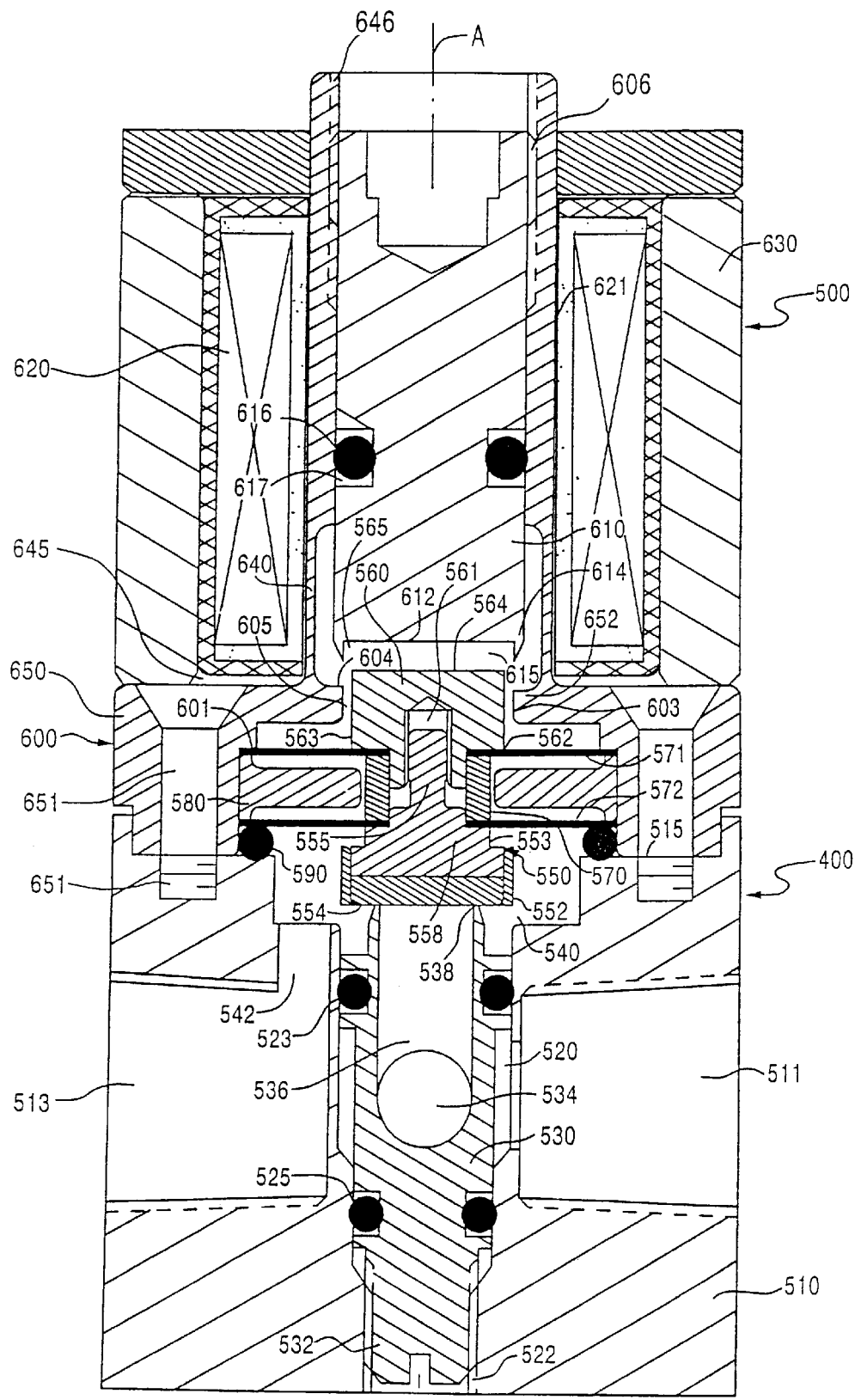
FIG. 5 is a longitudinal, cross-sectional diagrammatic illustration of the improved proportional solenoid-controlled fluid valve assembly embodying the present invention.

Attention is now directed to FIG. 5, which is a longitudinal, cross-sectional diagrammatic illustration (taken along a plane containing a cylindrical axis of symmetry A) of the improved proportional solenoid-controlled fluid valve assembly embodying the invention, configured to obviate the need for an alignment and support element of non-magnetic material. The solenoid-controlled valve assembly includes a valve unit 400 to which a solenoid unit 500 is attached.

The valve unit 400 is similar to the valve units of the solenoid-controlled valve assemblies of FIGS. 1–4 and includes a generally cylindrical base member 510 having a fluid input port 511 and a fluid exit port 513, which are preferably threaded so as to facilitate their being coupled to respective sections of fluid transporting conduit (not shown). Within the cylindrical base member 510, the fluid input port 511 is coupled to a first generally cylindrical bore 520, in which a variable position, generally hollow valve seat 530 is installed.

For this purpose, the bore 520 may include a threaded region 522 that receives a corresponding threaded shank portion 532 of the hollow valve seat 530, which is retained in a fluid seal condition within the bore 520 by means of a pair of O-rings 523 and 525, on either side of a fluid entry aperture 534 within the hollow valve seat 530. Fluid entry aperture 534 is coupled to an interior cavity 536 of the valve seat 530 that terminates at a circular valve seat rim 538.

The bore 520 opens into an interior valve cavity 540 in which a valve poppet 550 is supported for solenoid-controlled closure against and opening away from the circular valve seat rim 538. The interior valve cavity 540 is coupled to the fluid exit port 513 by way of a bore 542 therebetween. The valve poppet 550 includes a generally cylindrical threaded sleeve portion 552 that terminates at a lower circular face 554, which is sized to cover and thereby shut the valve when brought into closing contact against the valve seat rim 538.

The valve poppet 550 has a generally stepped cylindrical body 553, an upper end of which includes a threaded stem 555 for engagement within a threaded axial bore 561 of a generally cylindrically shaped, axially translatable armature 560. A generally circular annular shoulder 558 of the valve poppet 550 is adapted to cooperate with an associated annular shoulder 562 of the axially translatable armature 560, so as to capture therebetween (by the threading of the valve poppet 550 into the armature 560) interior radial regions of first and second spiral-configured suspension springs 571 and 572 on either side of an inner spring-retaining, ferrule-shaped spacer 570.

Exterior radial regions of the springs 571 and 572 are similarly retained on either side of a generally disc shaped armature ring 580, that is installed between an interior annular ledge surface 601 of a magnetic pole piece 600, and an O-ring 590 atop a generally circular surface region 515 of the cylindrical base member 510. Each of the ferrule-shaped spacer 570 and the generally disc shaped armature ring 580 may be made of ferromagnetic or non-ferromagnetic material. Making each spring support spacer of ferromagnetic material and sizing the interior diameter of the disc shaped armature ring 580 to be adjacent to spacer 570 serves to enhance the radial magnetic coupling between the armature 560 and the magnetic pole piece 600.

The axially translatable armature 560 extends through a generally cylindrical bore 603 of the magnetic pole piece 600, so that the outer cylindrical surface 563 of the armature is slightly spaced apart from the interior cylindrical surface 604 of the bore 603 and thereby forms a radial air gap 605 therebetween. The moveable magnetic armature 560 terminates at a top generally circular surface 564 thereof adjacent to a first, longitudinal or generally axial portion 610 of the magnetic pole piece 600.

The first, generally axial portion 610 of the magnetic pole piece 600 is comprised of a generally cylindrically configured solid ferromagnetic element, that is sized to fit within and is generally coaxial with the axis A of the generally cylindrical bore 621 of a solenoid coil 620, that is installed within a housing 630 of ferromagnetic material. The housing may be provided with a sidewall aperture (not shown) for leads that supply electrical connection between the solenoid coil and a current control source (also not shown). The first, generally axial portion 610 of the magnetic pole piece 600 has a distal end 612 thereof that is axially spaced apart from and is magnetically coupled with the top generally circular surface 564 of the axially translatable armature 560, so as to form an axial air gap 565 therebetween.

Extending axially outwardly from the distal end 612 of the generally axial portion 610 of the magnetic pole piece is a generally tubular or ferrule-shaped projection 614 having a tapered or varying thickness in the axial direction. This tapered projection 614 is radially spaced apart from and magnetically coupled with the cylindrical sidewall of the axially moveable armature 560, by a radial air gap 615, so as to form therewith a magnetic flux path shunt.

Figure 6:
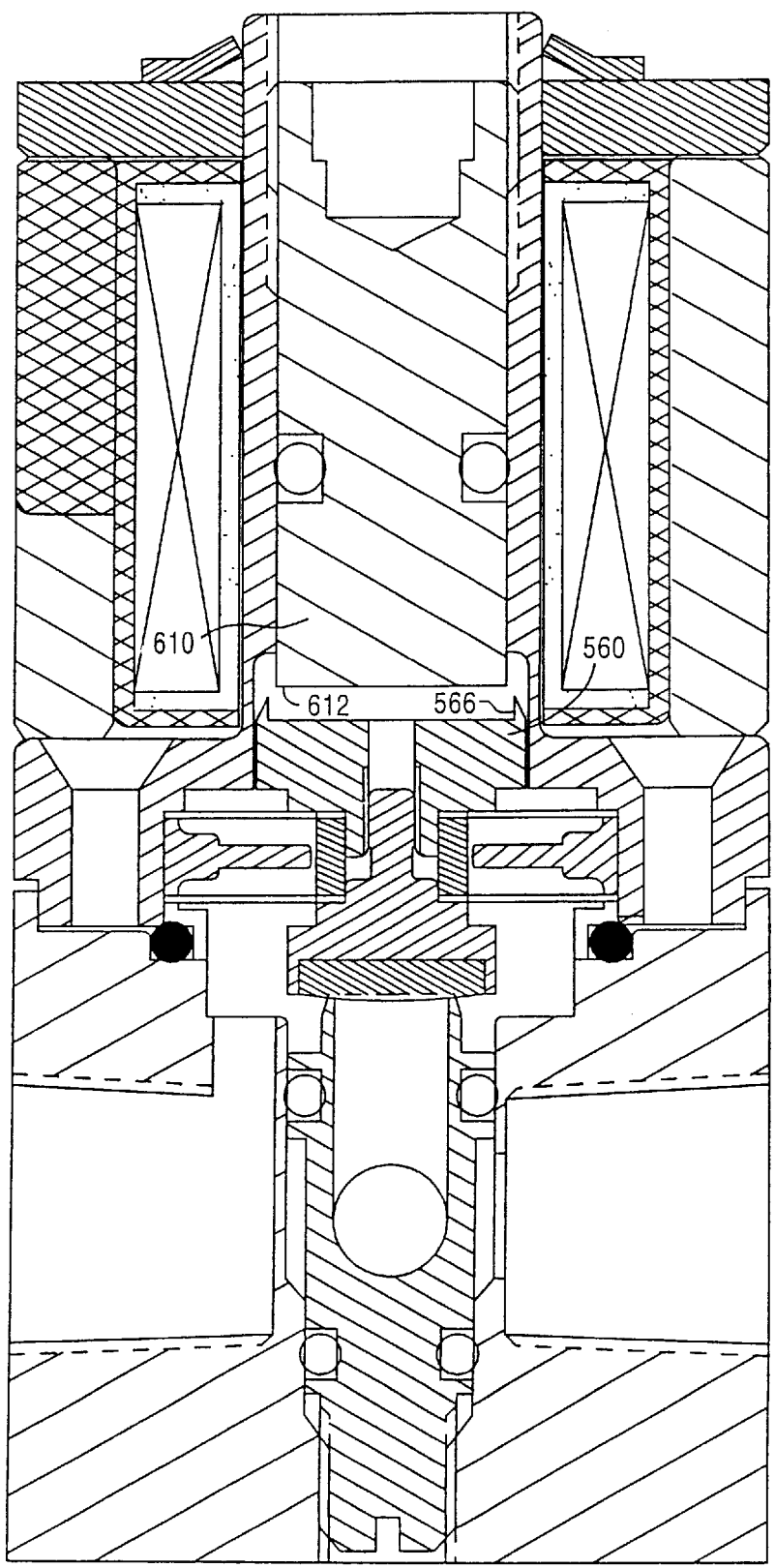
FIG. 6 shows a modification of the structure of FIG. 5 in which the armature has a tapered annular projection magnetically coupled with the magnetic pole piece.

Conversely, in lieu of providing the annular shunt projection on the distal end 612 of the generally axial portion 610 of the magnetic pole piece, an equivalent shunt structure may be provided as shown in FIG. 6, in which the top generally circular surface 564 of the axially translatable armature 560 has a tapered annular projection 566, spaced apart from and magnetically coupled with the distal end 612 of the generally axial portion 610 of the magnetic pole piece.

(As the remainder of the architecture shown in FIG. 6 is the same as that shown in FIG. 5, described above, no additional description thereof will be presented here.)

The ferrule-shaped projection (either on the first axial portion 610 of the magnetic pole piece as shown in FIG. 5, or on the moveable magnetic armature 560 as shown in FIG. 6) allows for relative axial translation between the movable armature 560 and the fixed magnetic pole piece 600, as the moveable armature 560 is axially translated.

The magnetic pole piece further includes a second, generally annular or cylindrical portion 640 of relatively thin, ferromagnetic material that is continuous with the first, generally axial portion 610 and is radially spaced apart from the lower distal end of the pole piece portion 610. As pointed out above, this relatively thin, annular axial pole piece portion 640 is rapidly saturated by magnetic field generated by the solenoid coil, and it is configured to be effectively mechanically solid with the main pole piece for fluid leakage containment.

In the embodiments shown in FIGS. 5 and 6, this is achieved by configuring the first, generally axial portion 610 of magnetic pole piece 600 as a generally cylindrical component that is externally threaded as shown at 606, so that it may be threaded into and retained by a threaded interior cylindrical bore 646 of the cylindrical portion 640 of the pole piece. Fluid leakage containment is achieved by means of an O-ring 616 captured within an annular groove 617 formed within the cylindrical sidewall of the axial portion 610.

The second, generally annular or cylindrical portion 640 of the magnetic pole piece is continuous with a third, generally radial body portion 650. The radial body portion 650 of the magnetic pole piece may have a generally cylindrical configuration and is sized to be secured to the generally circular surface region 515 of the cylindrical base member 510 of the valve unit 400, as by means of attachment screws (not shown) inserted through (countersunk) bores 651 of the radial body portion and engaging associated tapped bores 516 in the valve body 510. Being continuous or solid with the second portion 640 of the magnetic pole piece as shown enables the radial body portion 650 of the magnetic pole piece to form with the housing a generally annular space 645 that accommodates the coil 620.

The generally radial body portion 650 of the magnetic pole piece 600 includes a radially inwardly projecting portion 652 that defines the size of the generally cylindrical bore 603 of the magnetic pole piece 600, so that the outer cylindrical surface 563 of the armature is slightly spaced apart from the interior cylindrical surface 604 of the bore 603 and forms the radial air gap 605 therebetween.

Because the radial air gap 605 is very narrow and of a fixed radial distance, the magnetic flux path between the armature 560 and projecting portion 652 of the generally radial body portion 650 of the magnetic pole piece is also a low magnetic reluctance radial path. In addition, as described previously, the cylindrical shapes of the radial air gaps 605 and 615 constrains movement of the armature 560 in the axial direction only, preventing potential off-axis distortion of the suspension springs 571 and 572, so as to avoid otherwise impairing operation of the valve.

Unlike the solenoid structures, described previously, the integral pole piece and support architecture of the invention does not require a non-magnetic material in the magnetic flux flow path. It thereby considerably reduces hardware and manufacturing complexity and cost associated with solenoid structures (including that described in the above-referenced Nippert et al patent) that use non-ferromagnetic materials as part of flux path containment and pole piece—armature alignment.

Figure 7:
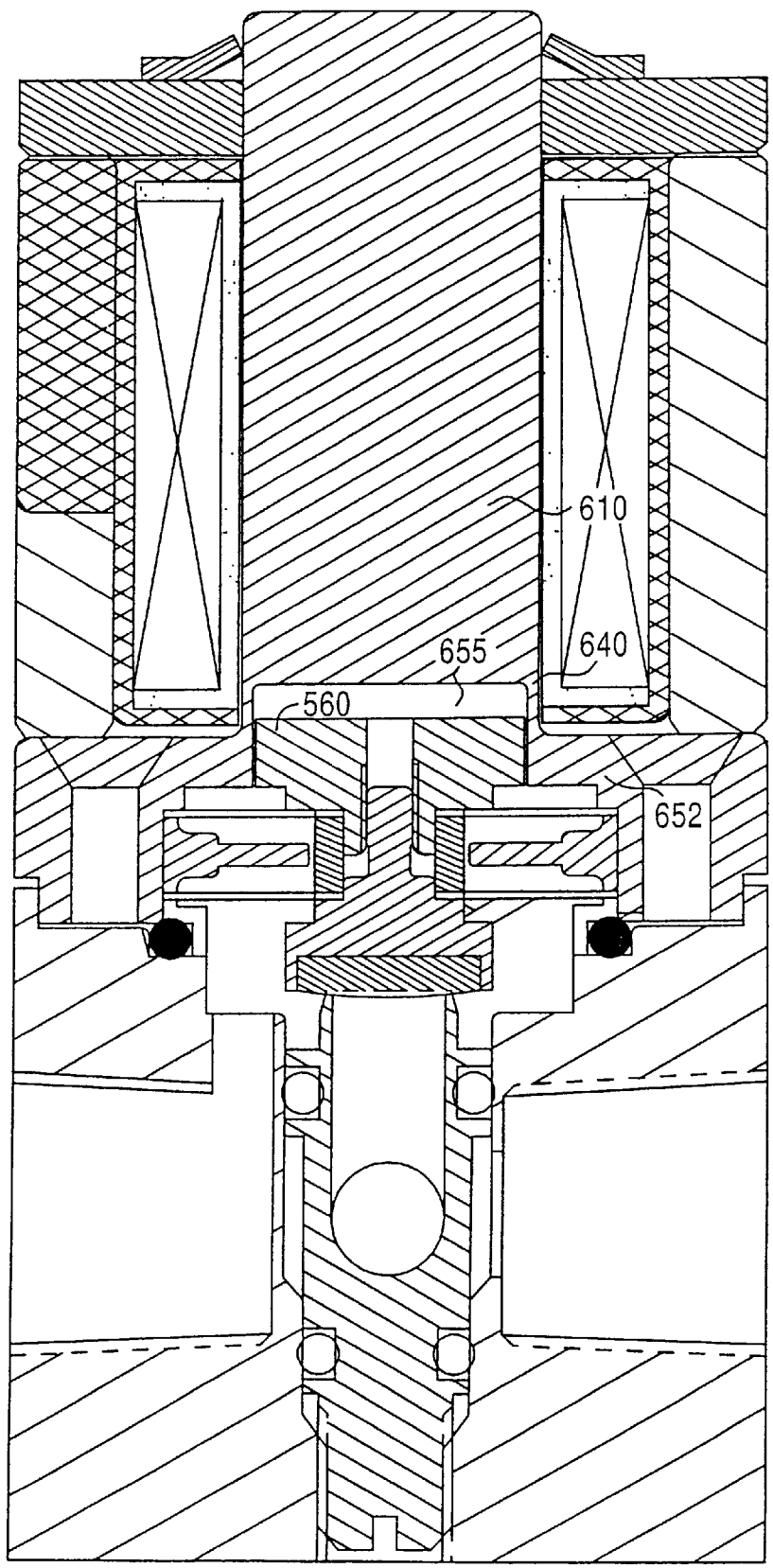
FIG. 7 shows a further modification of the structure of FIG. 5, in which the pole piece is formed as a single element, providing fluid leakage containment and an interior cavity sized to accommodate the movable magnetic armature.

As a further alternative configuration, shown in FIG. 7, the generally axial pole piece portion 610, the annular axial pole piece portion 640 and the radial portion 652 may be formed in the same pole piece element. This not only provides fluid leakage containment, but forms an interior cavity 655 adjacent to the radial portion 652. The cavity 655 is sized to accommodate the movable magnetic armature 560, so that the movable armature is axially magnetically coupled with the main axial portion 610 and radially coupled with the annular pole piece portion 640 and the radial portion 652. (As the remainder of the architecture shown in FIG. 7 is the same as that shown in FIG. 5, described above, no additional description thereof will be presented here.)

As will be appreciated from the foregoing description, by configuring its ferromagnetic pole piece to include a main longitudinal axial pole piece portion that is effectively solid with a relatively thin, annular axial pole piece portion and a radial portion solid with the annular axial portion, the solenoid actuated valve of the present invention both eliminates the need for a support element of non-magnetic material (and requisite alignment thereof) in the magnetic flux flow path of a proportional solenoid architecture and also provides for fluid leakage containment, thereby reducing the complexity and cost of manufacturing.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed is:

1. A solenoid assembly comprising:
    a solenoid coil producing a magnetic field, and having a longitudinal axis and a bore coaxial therewith;
    a magnetic pole piece disposed within said bore of said solenoid coil; and
    an axially movable armature of magnetic material, supported for axial translation relative to said magnetic pole piece; and wherein
    said magnetic pole piece includes
        a first, generally axial portion having an end thereof axially spaced apart from and magnetically coupled with said axially movable armature,
        a second, generally annular portion continuous with said first, generally axial portion of said magnetic pole piece and being radially spaced apart from said end thereof, and
        a third, generally radial portion continuous with said second, generally annular portion, and being radially spaced apart from and magnetically coupled with said axially moveable armature.

2. The solenoid assembly according to claim 1, further comprising a coil housing to retain said solenoid coil.

3. The solenoid assembly according to claim 1, wherein said third, generally radial portion of said magnetic pole piece is solid with said housing, so that support for and axial alignment of first portion of said magnetic pole piece relative to said axially moveable armature is provided by said second and third portions of said magnetic pole piece continuous therewith, and is exclusive of a non-magnetic element.

4. The solenoid assembly according to claim 1, wherein said second and third portions of said magnetic pole piece are configured to form, with said housing, a generally annular space that receives a portion of said solenoid coil.

5. The solenoid assembly according to claim 1, wherein said third portion of said magnetic pole piece includes a radially inwardly projecting portion that is adjacent to but radially spaced apart from and magnetically coupled with said axially moveable armature.

6. The solenoid assembly according to claim 1, further including a valve unit, mechanically coupled with said axially movable armature, and being operative to regulate fluid flow between a fluid input port and a fluid exit port thereof.

7. The solenoid assembly according to claim 6, wherein said third, generally radial portion of said magnetic pole piece is attached to said valve unit.

8. The solenoid valve assembly according to claim 6, wherein said valve unit comprises a base member having a fluid cavity coupled in fluid communication with said fluid input and fluid exit ports and containing a valve seat, which is closed by a valve poppet that is coupled with said moveable magnetic armature.

9. The solenoid assembly according to claim 8, wherein said valve seat is axially adjustable within said valve unit.

10. The solenoid assembly according to claim 1, wherein said first and second portions of said magnetic pole piece are configured to be relatively axially adjustable.

11. The solenoid assembly according to claim 10, wherein said first and second portions of said magnetic pole piece are threaded for relative axial engagement therebetween.

12. The solenoid assembly according to claim 11, wherein said first and second portions of said magnetic pole piece are provided with a fluid seal there between.

13. The solenoid assembly according to claim 1, wherein said region of said end of said first generally axial portion of said magnetic pole piece includes a projection adjacent to an interior recess that is sized to accommodate an end portion of said axially moveable armature, and form therewith said magnetic flux path shunt.

14. A solenoid assembly according to claim 13, wherein said projection has a generally annular configuration that surrounds said end portion of said axially moveable armature.

15. The solenoid assembly according to claim 1, wherein said axially moveable armature is supported for axial translation relative to said magnetic pole piece by a suspension spring arrangement located outside said bore.

16. A solenoid assembly comprising:
a housing of magnetic material;
a solenoid coil contained within said housing, said solenoid coil having a longitudinal axis and a bore coaxial therewith and producing a magnetic field;
a magnetic pole piece including an axial portion thereof supported within said bore, exclusive of the use of a non-magnetic material; and
an armature that is axially translatable relative to and axially and radially magnetically coupled with said magnetic pole piece, wherein said axial portion of said magnetic pole piece has an end thereof axially spaced apart from and magnetically coupled with said armature, said end of said axial portion including a region that is radially spaced apart from and magnetically coupled with a region of said armature so as to form therewith a magnetic flux path shunt, and wherein said magnetic pole piece further includes a relatively thin, generally annular portion that rapidly saturates in the presence of said magnetic pole, and is effectively mechanically solid with said axial portion, so as to provide fluid leakage containment, and is radially spaced apart from said end thereof, and a generally radial portion continuous with said generally annular portion, an being radially spaced apart from and magnetically coupled with said armature.

17. The solenoid assembly according to claim 16, further including a valve unit, attached to said generally radial portion of said magnetic pole piece and being mechanically coupled with said axially movable armature, and operative to regulate fluid flow between a fluid input port and a fluid exit port thereof.

18. A proportional solenoid-controlled valve assembly comprising:
a housing containing a solenoid coil having a longitudinal axis and a bore coaxial therewith disposed within a housing containing magnetic material for providing a flux path for said magnetic field;
a magnetic pole piece having a generally axial portion disposed within said bore and having an end thereof axially spaced apart from and magnetically coupled with an axially movable armature, said end of said generally axial portion of said magnetic pole piece including a region that is radially spaced apart from and magnetically coupled with a region of said axially moveable armature so as to form therewith a magnetic flux path shunt, a generally annular portion continuous with said generally axial portion of said magnetic pole piece and being radially spaced apart from said end thereof, and continuous with a generally radial portion that is radially spaced apart from and radially magnetically coupled with said axially moveable armature, said generally radial portion of said magnetic pole piece being solid with said housing, so that support for and axial alignment of said generally axial portion of said magnetic pole piece relative to said axially moveable armature is provided by said generally annular and radial portions of said magnetic pole piece continuous therewith, and is exclusive of a non-magnetic element; and
a valve unit solid with said magnetic pole piece and being mechanically coupled with said axially movable armature, and being operative to regulate fluid flow between a fluid input port and a fluid exit port thereof.

19. The proportional solenoid-controlled valve assembly according to claim 18, wherein said valve unit comprises a base member having a fluid cavity coupled in fluid communication with said fluid input and fluid exit ports and containing a valve seat, which is closed by a valve poppet coupled with said moveable magnetic armature, and wherein said valve seat is axially adjustable within said valve unit.

* * * * *